United States Patent [19]

Merrick

[11] Patent Number: 4,983,437

[45] Date of Patent: Jan. 8, 1991

[54] COMPACT DISC PROTECTOR

[76] Inventor: Steven L. Merrick, 3209 W. 76th St., Edina, Minn. 55435

[21] Appl. No.: 341,625

[22] Filed: Apr. 21, 1989

[51] Int. Cl.$^5$ .............................. B32B 7/06; B32B 7/10
[52] U.S. Cl. ......................................... 428/40; 428/65; 428/80; 428/908.8
[58] Field of Search .................. 428/65, 80, 343, 412, 428/908.8, 40

[56] References Cited

U.S. PATENT DOCUMENTS

| | | | |
|---|---|---|---|
| 4,378,392 | 3/1983 | Segal | 428/343 |
| 4,609,964 | 9/1986 | Sobel | 428/65 |
| 4,760,012 | 7/1988 | Mochizuki | 428/65 |

Primary Examiner—George F. Lesmes
Assistant Examiner—J. Davis
Attorney, Agent, or Firm—Hugh D. Jaeger

[57] ABSTRACT

A thin, flat, polymer, scratch resistant, user applied disc protector with self-adhesive backing which affixes to the top of a compact disc to help eliminate possible damage from impact which would render the disc in a semi-unplayable or unplayable condition. This extra layer of user applied protection is prefabricated to proper size to adhesively secure to various optical mediums with a self-adhesive layer by an application method of installation on the top, protective side of the disc. Adhesive allows for permanent placement on the disc for convenience without hindering operation of the disc and without hindering readability of the context of the information lettering. This disc protector can include a removable peel-away backing.

1 Claim, 4 Drawing Sheets

COMPACT DISC PROTECTOR

CROSS REFERENCES TO CO-PENDING APPLICATIONS

None.

BACKGROUND OF THE INVENTION

1. Field of the Invention

The present invention pertains to a compact disc protector, and more particularly, pertains to a compact disc protector which is thin, scratch resistant, polymer material and user applied.

2. Description of the Prior Art

Compact discs are made with little physical protection for the top of the disc making the information layer vulnerable to damage over long term use. Damage to the information layer can result in tracking errors in the form of distortion of the music and/or dialog, or can cause erroneous tracking problems for the player's computer to have difficulty in focusing on the information, thereby producing miscues and skips.

The present invention overcomes the disadvantages of the prior art by providing a compact disc protector which is designed to be easily applied to an optical compact disc by the consumer. It is a self-contained structure of a peel-away back on a self-adhesive transparent member that can be placed on the label side of the compact disc without damage to the optical disc or optical disc player.

SUMMARY OF THE INVENTION

The general purpose of the present invention is a thin, scratch resistant, user applied, transparent polymer disc with a self-adhesive backing capable of negating possible damage to the information on the top surface of the compact disc.

Optical information discs, such as compact discs, are made of a transparent polymer, such as polycarbonate, disc with a patterned information bearing surface, a specularly reflective metal surface, such as aluminum, and a protective layer. The transparent base is about 0.3-1.2 mm. The thickness of the vapor deposited metal information surface is approximately 1/10 micron. Then, a protective layer over the information layer is applied, such as a mere 20 microns of a protective lacquer coating.

The laser beam from the pickup device shines through the transparent polycarbonate bottom side of the disc, reading the information stored in the form of microscopic pits, sending this data to the players circuitry to be interpreted in the form of music, video, or computer data.

The protective lacquer side is for protecting the information layer and preventing oxidation of the metal surface. It is also for receiving a silk screen labeling of the disc for identification and content purposes.

Although a blemish on the bottom polycarbonate layer will hinder the laser's ability to read the data on the disc, a more severe problem would be to have an accidental, partial removal of the information from the top, label side, or even affecting the metal surface and the condition of the information digital carrying microscopic pits. This top layer is very thin, as well as being composed of a very fragile lacquer layer which is easily damaged by the glance of a hard object dropping on the disc or the disc falling on an object. This layer may also deteriorate from long term exposure to oils, such as from finger prints, acids, such as from the hand, salts, dirt, scratches, and intentional or unintentional abuse above normal handling.

Simple experimentation with ordinary household items, such as keys, paper clips and screwdrivers, can show how delicate this lacquer surface is. With little pressure from the tip of an unfolded paper clip, drawing it across the label side, the lacquer coating and the metal layer can easily be removed, causing a severe drop out on the disc. Dropping the disc on stereo components and ordinary household furniture also causes drop-outs.

Over normal use, compact discs, in particular the valuable information layer, becomes vulnerable once the supplied storage case (jewel box as referred to in the trade) is opened. Research has shown that a simple indicator of lost data is to hold the disc next to a light source and take note of the approximate quantity or size of the light holes shining through the disc. A factory-fresh disc has very few or no holes in the information layer. By examining various user's compact disc collections, an unusual amount of these holes can be observed. The more the disc has been played, is proportional to the number of holes unless the user is very meticulous. By noting when a compact disc player has had problems tracking a particular disc, the disc was taken out and examined for tracking error symptoms. Many of the problems of tracking errors correlate with scratched or damaged areas on the label side. It is assumed that no one would intentionally scratch their disc; therefore, it can be concluded that the discs get abused unintentionally under normal use, either as they are being removed from the case or being replaced in the case, or the disc player itself is causing a problem.

According to one embodiment of the present invention, there is provided a precut transparent disc shape, slightly smaller than the optical disc, to cover the area of the disc that has the protective layer, and uses high technology scratch resistant polymer material for optimum protection. The disc includes a selfadhering, adhesive layer, and a peel-away backing on the adhesive layer.

One significant aspect and feature of the present invention is a compact disc protector made of high tech polymer material which reduces risk of damage to an optical disc or to the informational material.

Another significant aspect and feature of the present invention includes a self-adhesive backing that can be easily applied by the user, and may be removed and reapplied a limited number of times without compromising the effectiveness of the disc protector.

A further significant aspect and feature of the present invention is that the compact disc protector is not harmful to the optical disc, the metallized layer, the protective lacquer coating, the silk screen label information, nor the optical disc player.

Having thus described the embodiments of the present invention, it is the principal object hereof to provide a compact disc protector.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals desig

DESCRIPTION OF THE PREFERRED EMBODIMENTS

Figure 1:
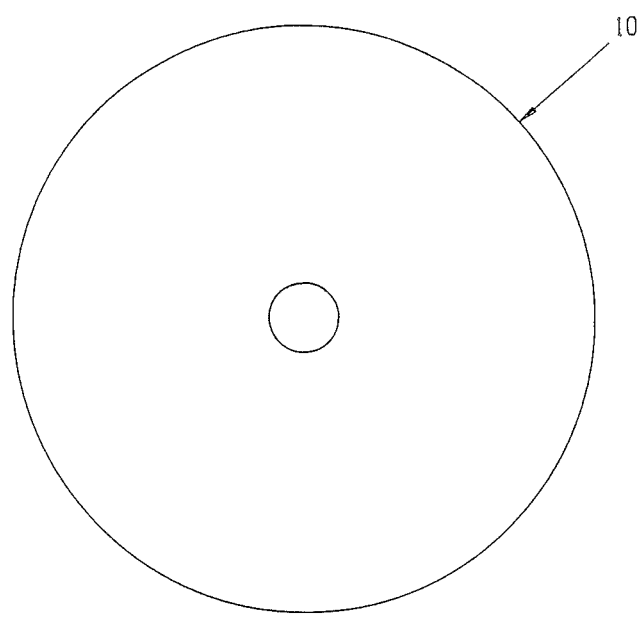
- FIG. 1 illustrates a top view of a compact disc protector.
Figure 3:
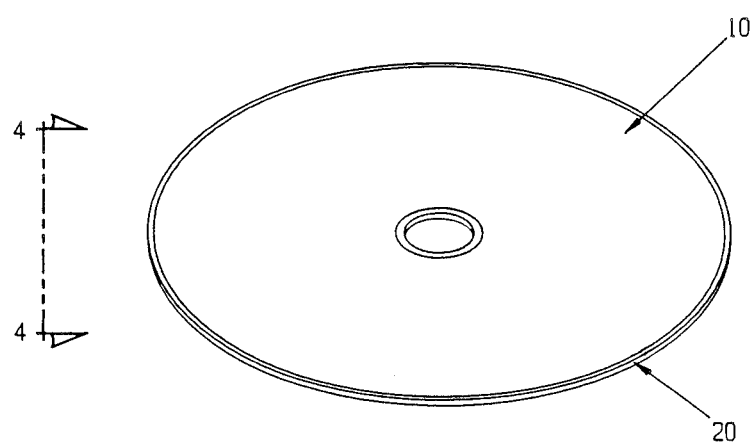
FIG. 3 illustrates a perspective view of a compact disc with the compact disc protector; and, FIG. 4 illustrates a vieW taken along line 4—4 of FIG. 3.

FIG. 1 illustrates a top view of a compact disc protector 10. Referring also to FIG. 3, the compact disc protector includes a polymer material 12, such as a polycarbonate, an adhesive 14 which is compatible with silk screened information on the compact disc and is compatible with the aluminum metallized layer, and a peel-away backing 16. The polymer material 12 can be any suitable polymer, such as 1-20 mils thick material such as polycarbonate. The polymer layer can be color coded. Lexan is one example and can also include a scratch resistant coating, such as MARNOT hardcoat, or other protective finish. In lieu of the polycarbonate material, a polyester or polyethylene, polypropylene, kapton or other like types of material can be utilized. While it is intended that the compact disc protector is transparent, the compact disc protector can also be opaque. The adhesive 14 can be an appropriate adhesive, such as an acrylic adhesive, which is compatible with the lacquer protective coating and the vapor deposited aluminum metal layer, 3M "#400" acrylic adhesive is one type of suitable adhesive. An additional transparent and optionally color coated layer 13 can be provided for UV protection. Information 18 can also be printed onto the compact disc protector 10 onto either side of the layer 10 or on the upper side of the layer 13. In this instance, information 18 is printed on the upper side of layer 13. The information can also be printed on either side of the material 12.

Figure 2:
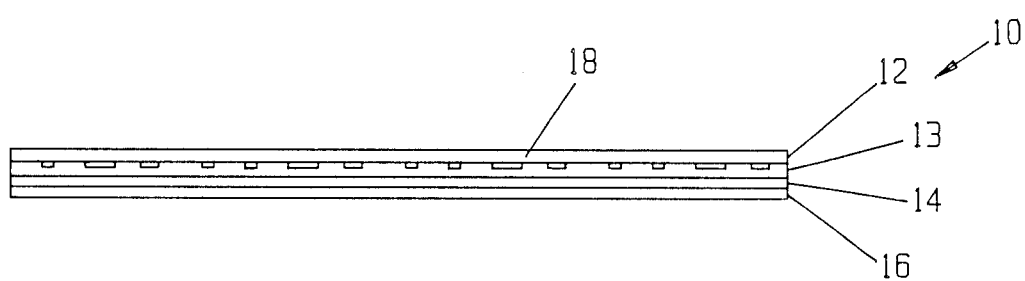
FIG. 2 illustrates a side view of the compact disc protector.

FIG. 2 illustrates a side view of FIG. 1 where all numerals correspond to those elements previously described.

MODE OF OPERATIONS

Figure 4:
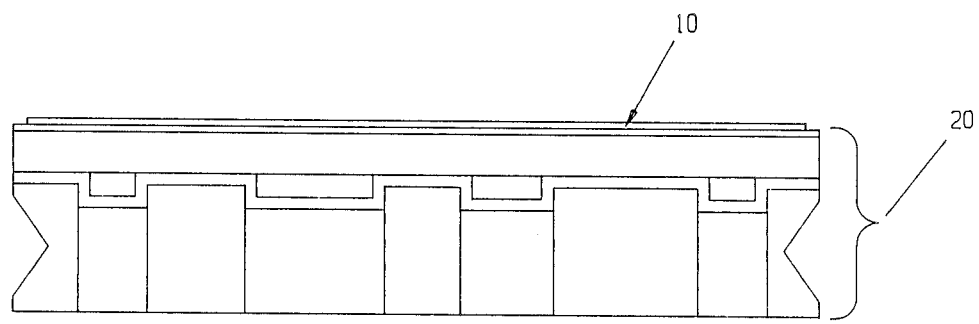

FIGS. 3 and 4 show a perspective view and a side view, respectively, of the compact disc protector 10 on a compact disc 20. Prior to application, the peel-away backing 16 is peeled off of the compact disc protector 10 and then disposed of. The radii of the compact disc protector 10 is aligned with the radii of the compact disc 20, and adhesively secured to the compact disc. Compact discs are manufactured in two sizes, 3½ inch (8 cm) and inch (12 cm) sizes. The compact disc protector will be appropriately sized to the disc or medium. The compact disc protector may also provide for dampening against vibration, such as by increased thickness or the addition of a suitable filler material such as glass fibers to enhance audio reproduction.

The compact disc protector 10 also can be used with other medium storing information, such as optical discs and records. The use of the present invention is not strictly limited to compact discs, nor strictly limited to one size of compact discs. Teachings of the present invention can further be extended to video discs or compact discs. The adhesive can be externally applied, such as at the compact disc point of manufacture or by the user.

Various modifications can be made to the present invention without departing from the apparent scope hereof.

I claim:

1. Compact disc protector for protecting a top surface containing information and a reflective surface embedded within a compact disc comprising in order:
   a. a thin, transparent, scratch-resistant polymer layer with a diameter slightly less than the outer diameter of the compact disc and having an inner hole slightly larger than the inner hole of the compact disc;
   b. information or graphics printed onto said polymer layer;
   c. ultra violet protection coating to reduce damage caused by natural or artificial light coated onto said polymer layer;
   d. a pressure sensitive adhesive coated over said ultraviolet protector; and
   e. peel-away backing affixed to said pressure sensitive adhesive for subsequent end user application.

* * * * *